United States Patent
Agarwal

(10) Patent No.: US 12,554,878 B2
(45) Date of Patent: Feb. 17, 2026

(54) PHONE NUMBER OBFUSCATION IN SOCIAL MEDIA PLATFORMS

(71) Applicant: WhatsApp LLC, Menlo Park, CA (US)

(72) Inventor: Kanak Behari Agarwal, Austin, TX (US)

(73) Assignee: WhatsApp LLC, Menlo Park, CA (US)

( * ) Notice: Subject to any disclaimer, the term of this patent is extended or adjusted under 35 U.S.C. 154(b) by 190 days.

(21) Appl. No.: 18/237,848

(22) Filed: Aug. 24, 2023

(65) Prior Publication Data

US 2025/0068763 A1    Feb. 27, 2025

(51) Int. Cl.
*G06F 21/62* (2013.01)
*G06Q 50/00* (2024.01)

(52) U.S. Cl.
CPC ......... *G06F 21/6245* (2013.01); *G06Q 50/01* (2013.01)

(58) Field of Classification Search
CPC .. G06F 21/6245; G06F 21/6254; G06Q 50/01
USPC ........................................................ 726/26
See application file for complete search history.

(56) References Cited

U.S. PATENT DOCUMENTS

| | | | | |
|---|---|---|---|---|
| 11,449,861 B2* | 9/2022 | DePopas | ............... | G06Q 20/227 |
| 2006/0253898 A1* | 11/2006 | Ogata | ................... | H04L 63/083 |
| | | | | 726/4 |
| 2011/0069661 A1* | 3/2011 | Waytena, Jr. | ......... | H04W 88/16 |
| | | | | 455/414.3 |
| 2012/0124656 A1* | 5/2012 | Senac | ................. | H04L 63/0853 |
| | | | | 726/9 |
| 2012/0207292 A1* | 8/2012 | Rosenberg | ............ | H04L 51/046 |
| | | | | 379/93.01 |
| 2013/0042310 A1* | 2/2013 | Najafi | ..................... | G06F 21/31 |
| | | | | 726/7 |
| 2015/0254659 A1* | 9/2015 | Kulkarni | .............. | G06Q 20/325 |
| | | | | 705/44 |
| 2016/0078430 A1* | 3/2016 | Douglas | ............ | G06Q 30/0185 |
| | | | | 705/43 |
| 2016/0127369 A1* | 5/2016 | Zhang | ..................... | H04W 4/14 |
| | | | | 726/6 |
| 2018/0130056 A1* | 5/2018 | Smales | ................ | H04L 67/125 |

FOREIGN PATENT DOCUMENTS

| WO | 2017029677 A1 | 2/2017 |
|---|---|---|
| WO | 2021205240 A1 | 10/2021 |
| WO | 2022162414 A1 | 8/2022 |

OTHER PUBLICATIONS

Extended European Search Report for European Patent Application No. 24178333.1, mailed Nov. 8, 2024, 9 pages.

* cited by examiner

*Primary Examiner* — Kaylee J Huang
(74) *Attorney, Agent, or Firm* — EVERSHEDS SUTHERLAND (US) LLP

(57) ABSTRACT

Methods, systems, and storage media for obscuring a user identifier on a social media platform are disclosed. Exemplary implementations may: register a client device based on a user identifier; generate an internal supplemental identifier associated with the user identifier; receive a confirmation of the SMS message from the client device based on the user identifier; implement the internal supplemental identifier between client-side transactions and server-side transactions; and generate a display name associated with the internal supplemental identifier.

18 Claims, 6 Drawing Sheets

PHONE NUMBER OBFUSCATION IN SOCIAL MEDIA PLATFORMS

TECHNICAL FIELD

The present disclosure generally relates to secure communications, and more particularly to phone number obfuscation, such as on social media platforms and instant messaging platforms.

BACKGROUND

Social media platforms facilitate sharing of information among virtual communities and networks. Social media platforms typically include interactive internet-based applications. Users on social media platforms send and receive content, such as through posts on user feeds, direct messages, etc. The content can include text, audio, video, and/or images. The use of mobile phones has become a crucial part of modern-day communication. The growth of mobile phones has brought about the widespread use of social media and instant messaging apps as a means of communication. However, the use of mobile numbers as identification in these apps may pose security risks, such as identity theft and hacking.

BRIEF SUMMARY

The subject disclosure provides for systems and methods for secure communications. A user is allowed to use a logical ID or LID as their new addressable user identity in the system without revealing their corresponding phone number. LIDs are server-generated unique IDs assigned to every user in the system during registration, bulk allocation, or on-demand allocation during login for existing users.

One aspect of the present disclosure relates to a method for obscuring a user identifier on a social media platform. The method may include registering a client device based on a user identifier. Registering may include transmitting an SMS message including a verification code to the client device, based on the user identifier. The method may include generating an internal supplemental identifier associated with the user identifier. The method may include receiving a confirmation of the SMS message from the client device based on the user identifier. The confirmation may include the verification code. The method may include implementing the internal supplemental identifier between client-side transactions and server-side transactions. The method may include generating a display name associated with the internal supplemental identifier. The display name may be distinct for the user identifier.

Another aspect of the present disclosure relates to a system configured for obscuring a user identifier on a social media platform. The system may include one or more hardware processors configured by machine-readable instructions. The processor(s) may be configured to register a client device based on a user identifier. The user identifier may include a phone number. Registering may include transmitting an SMS message including a verification code to the client device, based on the user identifier. The processor(s) may be configured to generate an internal supplemental identifier associated with the user identifier. The internal supplemental identifier may be unidentifiable to an entity external to a social media server. A mapping between the internal supplemental identifier and user identifier may be 1 to 1 (1:1). The processor(s) may be configured to receive a confirmation of the SMS message from the client device based on the user identifier. The confirmation may include the verification code. The processor(s) may be configured to implement the internal supplemental identifier between client-side transactions and server-side transactions. The processor(s) may be configured to generate a display name associated with the internal supplemental identifier. The display name may be distinct for the user identifier. The display name may be unique to the user identifier.

Yet another aspect of the present disclosure relates to a non-transient computer-readable storage medium having instructions embodied thereon, the instructions being executable by one or more processors to perform a method for obscuring a user identifier on a social media platform. The method may include registering a client device based on a user identifier. The user identifier may include a phone number. Registering may include transmitting an SMS message including a verification code to the client device, based on the user identifier. The method may include generating an internal supplemental identifier associated with the user identifier. The internal supplemental identifier may be unidentifiable to an entity external to a social media server. A mapping between the internal supplemental identifier and user identifier may be 1:1. The method may include receiving a confirmation of the SMS message from the client device based on the user identifier. The confirmation may include the verification code. The method may include implementing the internal supplemental identifier between client-side transactions and server-side transactions. The method may include generating a display name associated with the internal supplemental identifier. The display name may be distinct for the user identifier. The display name may be unique to the user identifier. The method may include displaying the display name in a user interface during communication by the client device.

Still another aspect of the present disclosure relates to a system configured for obscuring a user identifier on a social media platform. The system may include means for registering a client device based on a user identifier. Registering may include transmitting an SMS message including a verification code to the client device, based on the user identifier. The system may include means for generating an internal supplemental identifier associated with the user identifier. The system may include means for receiving a confirmation of the SMS message from the client device based on the user identifier. The confirmation may include the verification code. The system may include means for implementing the internal supplemental identifier between client-side transactions and server-side transactions. The system may include means for generating a display name associated with the internal supplemental identifier. The display name may be distinct for the user identifier.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Figure 1:
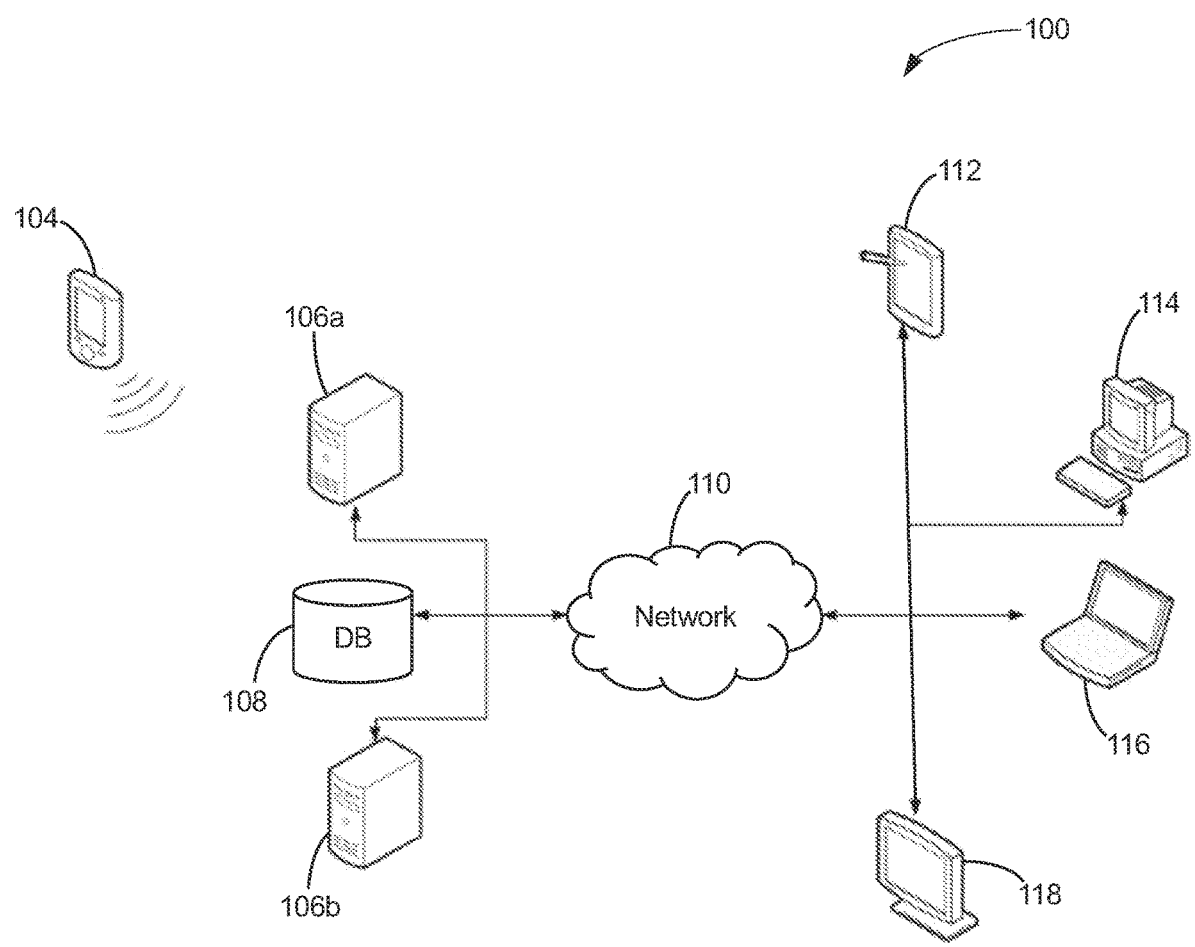
FIG. 1 is a block diagram illustrating an overview of an environment in which some implementations of the disclosed technology can operate.

FIG. 1 is a block diagram illustrating an overview of an environment 100 in which some implementations of the disclosed technology can operate. The environment 100 can include one or more client computing devices, mobile device 104, tablet 112, personal computer 114, laptop 116, desktop 118, and/or the like. Client devices may communicate wirelessly via the network 110. The client computing devices can operate in a networked environment using logical connections through network 110 to one or more remote computers, such as server computing devices. The server computing devices 106a-106b may be configured to show (e.g., make encrypted content visible) content to one or more of the client computing devices for those client computing devices that presented a correct public key. As an example, the server computing devices 106a-106b can include a database (e.g., database 108) that tracks which users of the client computing devices have granted access to their encrypted content (e.g., encrypted by corresponding privately held private keys) to other client users.

In some implementations, the environment 100 may include a server such as an edge server that receives client requests and coordinates fulfillment of those requests through other servers. The server may include the server computing devices 106a-106b, which may logically form a single server. Alternatively, the server computing devices 106a-106b may each be a distributed computing environment encompassing multiple computing devices located at the same or at geographically disparate physical locations. The client computing devices and server computing devices 106a-106b can each act as a server or client to other server/client device(s). The server computing devices 106a-106b can connect to a database 108 or can comprise its own memory. Each server computing device 106a-106b can correspond to a group of servers, and each of these servers can share a database 108 or can have its own database 108. The database 108 may logically form a single unit or may be part of a distributed computing environment encompassing multiple computing devices that are located within their corresponding server, located at the same, or located at geographically disparate physical locations. The database 108 can store data indicative of keys or access granted by a given user to other users of the given user's encrypted content and/or shared social media content that can be subscribed to by other users. The database 108 may also be used to facilitate key rotation in a one-to-many encryption architecture by causing issue of new keys when a copy of a shared key becomes comprised, for example.

The network 110 can be a local area network (LAN), a wide area network (WAN), a mesh network, a hybrid network, or other wired or wireless networks. The network 110 may be the Internet or some other public or private network. Client computing devices can be connected to network 110 through a network interface, such as by wired or wireless communication. The connections can be any kind of local, wide area, wired, or wireless network, including the network 110 or a separate public or private network. In some implementations, the server computing devices 106a-106b can be used as part of a social network such as implemented via the network 110. The social network can host content and protect access to the content, such as via the database 108, although the server computing devices 106a-106b of the social network do not have access to private keys and can be remote/separate from the application(s) that perform key generation and content encryption. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation, or other social networking system object, e.g., a movie, a band, a book, etc.

Content items can be any digital data such as text, images, audio, video, links, webpages, minutia (e.g., indicia provided from a client device such as emotion indicators, status text snippets, location indicators, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea. The social networking system can enable a user to enter and display information related to the users' interests, age/date of birth, location (e.g., longitude/latitude, country, region, city, etc.), education information, life stage, relationship status, name, a model of devices typically used, languages identified as ones the user is familiar with, occupation, contact information, or other demographic or biographical information in the users' profile. Any such information can be represented, in various implementations, by a node or edge between nodes in the social graph.

The social networking system can enable a user to upload or create pictures, videos, documents, songs, or other content items, and can enable a user to create and schedule events. Content items can be represented, in various implementations, by a node or edge between nodes in the social graph. The social networking system can enable a user to perform uploads or create content items, interact with content items or other users, express an interest or opinion, or perform other actions. The social networking system can provide various means to interact with non-user objects within the social networking system. Actions can be represented, in various implementations, by a node or edge between nodes in the social graph. For example, a user can form or join groups, or become a fan of a page or entity within the social networking system. In addition, the user can create, download, view, upload, link to, tag, edit, or play a social networking system object. The user can interact with social networking system objects outside of the context of the social networking system. For example, an article on a news website might have a "like" button that users can click. In each of these instances, the interaction between the user and the object can be represented by an edge in the social graph connecting the node of the user to the node of the object. As another example, the user can use location detection functionality (such as a GPS receiver on a mobile device) to "check-in" to a particular location, and an edge can connect the user's node with the location's node in the social graph.

The social networking system can provide a variety of communication channels to users. For example, the social networking system can enable a user to email, instant message, or text/SMS message, one or more other users. It can enable a user to post a message to the user's wall or profile or another user's wall or profile. It can enable a user to post a message to a group or a fan page. It can enable a user to comment on an image, wall post, or other content item created or uploaded by the user or another user. And it can allow users to interact (via their avatar or true-to-life representation) with objects or other avatars in a virtual environment (e.g., in an artificial reality working environment), etc. In some embodiments, a user can post a status message to the user's profile indicating a current event, state of mind, thought, feeling, activity, or any other present-time relevant communication. The social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, or provide a virtual environment where users can communicate and interact via avatars or other digital representations of themselves. Further, the first user can comment on the profile page of a second user or can comment on objects associated with the second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, see another user's friends, or view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse, or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users, and the relationship status of users can be used to determine whether users are connected. In some embodiments, users with common interests are considered connected. For example, users' movie preferences, music preferences, political views, religious views, or any other interests can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

The disclosure of personal phone numbers can be a concern to users of social media and messaging applications. Although communication is a primary function of these platforms, users may be hesitant to share their phone numbers with others, especially strangers. This may be particularly true in the case of workplace messaging applications where coworkers may be required to communicate but may not want to disclose their personal phone numbers. As a result, users may be hesitant to join groups or participate in conversations, which could lead to decreased engagement and productivity.

The subject disclosure provides for systems and methods for secure communications. A user is allowed to use a logical ID or LID as their new addressable user identity in the system without revealing their corresponding phone number. LIDs are server-generated unique IDs assigned to every user in the system during registration, bulk allocation, or on-demand allocation during login for existing users.

Implementations described herein address the aforementioned shortcomings and other shortcomings by providing a logical identifier (LID) that is unique to a user's account. This LID replaces the user's phone number and is used for all communications within the system. By doing so, users can communicate with each other without disclosing their personal phone numbers. The LID may be managed by a server and can be assigned during registration or through on-demand allocation during login for existing users. The system may include privacy settings that allow users to control who can access their phone numbers, preventing malicious users from scraping phone number information.

Some implementations may provide phone number hiding (PNH) that supports phoneless identity in a system. For example, some implementations may provide an addressable user identity called logical ID or LID. LIDs may be server-generated unique IDs assigned to every user in the system. LIDs may be assigned during registration for new users or through bulk (e.g., via crawler) or on-demand allocation during login for existing users. Any client on the network can be uniquely addressed using LID based IDs with these IDs belonging to a different domain than the phone number based identities. For example, in Jabber ID (JID) based systems, JID may be extended to support LID-based user and device identities as valid JIDs through the addition of a new JID domain called "lid". LID-based JIDs can be used anywhere in the client-server protocol to uniquely address a user or a device in the system without revealing the corresponding phone number.

LIDs may be managed during account lifecycle events such as re-registration and phone number change. LIDs may not change on re-registration for existing accounts but may change on re-registration after user account has been deleted either by the user or by the server due to inactivity. LIDs may change when a user changes their phone number through the change phone number flow.

An end-to-end encryption (E2EE) identity model may be adopted where a user's LID identity is fully decoupled with their phone number identity to prevent a malicious actor from unmasking a LID by cross-referencing the E2EE identity keys between LIDs and phone numbers. Each client may generate a separate identity key, signed pre-key, and a one-time set of pre-keys for their LID identity. These keys may then be used to establish an independent LID-based E2EE session for LID threads. An identity verification QR code may be modified to support out-of-band identity verification for LID-based identities.

Users may be given explicit control over phone number sharing through privacy settings. The clients, after discovering the participant's LIDs in chat threads such as groups, can issue a new query to fetch the LID to phone number mapping for these LIDs. The server may only reveal the phone numbers of the users whose privacy settings allow sharing their phone numbers with the requesting user.

Some implementations provide first-class support for 1:1 LID threads allowing clients to query the E2EE keys and device list by the recipient's LID and establish an E2EE 1:1 LID thread with that user. LID threads may use the LID-based JIDs everywhere in all protocols to avoid any mix and match between LID and phone number identities and E2EE sessions. Some use cases may include 1:1 conversations started from a group where the LID discovery happens via group and 1:1 threads with a business where LIDs can be discovered via a link. Some implementations may provide a graduation path through an atomic bi-directional contact exchange protocol to promote a LID thread to a regular phone number-based thread. Support for signed tokens may prevent unauthorized LID-based messaging outside approved contexts. According to some implementations, a server-side implementation may involve changes to the database schema to store the additional LID information, and a client-side implementation may involve updates to the user interface to handle LID-based threads and contact discovery.

Figure 2A:
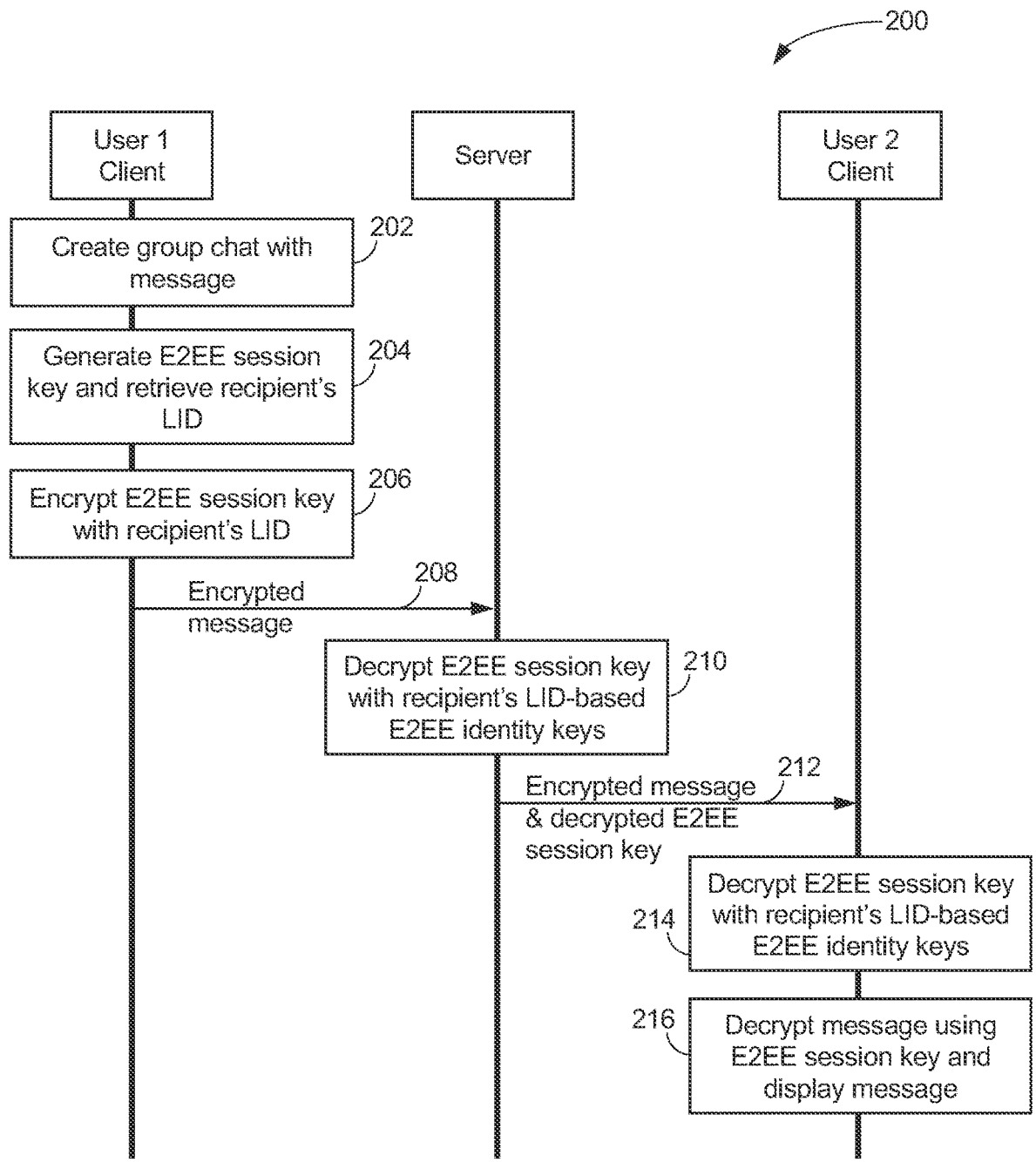
FIGS. 2A and 2B illustrate an example flow diagram for group messaging in which user phone numbers are obfuscated, in accordance with one or more implementations.
Figure 2B:
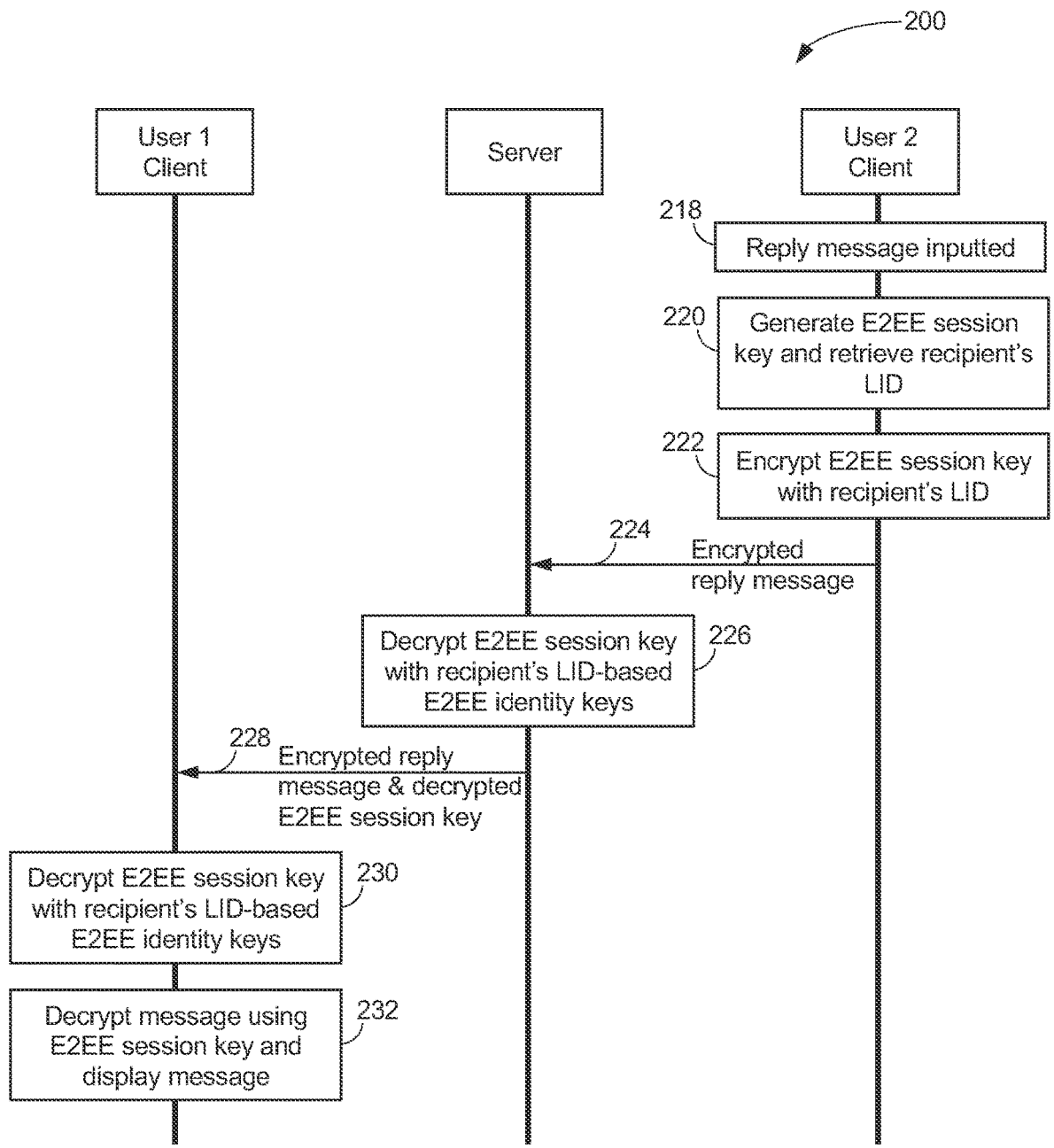

FIGS. 2A and 2B illustrate an example flow diagram (e.g., process 200) for group messaging in which user phone numbers are obfuscated, in accordance with some implementations. The process 200 includes several steps, starting with step 202. In step 202, the client attempts to send a message in a group chat. In step 204, the client retrieves the recipients LIDs from the server and generates E2EE sessions (e.g. in accordance with the Signal encryption protocol) with every group participant using its own LID and the recipient's LIDs as identifiers. The client uses the E2EE keys associated with the LID identities to create the E2EE session. Server does not expose the participants' phone numbers to the clients. The client then encrypts the group message using the LID-based E2EE sessions in step 206. In step 208, the client sends the encrypted message to the server.

In step 210, the server receives the encrypted message. In step 212, the server forwards the encrypted message to the recipient's device with the sender identity as LID of the sender. In step 214, the recipient's device decrypts the encrypted message by creating an E2EE session using its own LID-based E2EE keys and the sender's LID based keys. In step 216, the recipient's device decrypts the message using the E2EE session and displays it to the recipient.

In step 218, the recipient can choose to reply to the message. In step 228, the server forwards the encrypted reply message to all group participants including the sender's device. In step 232, the sender's device decrypts the reply message using the E2EE session and displays it to the sender. The sender and recipient can continue the conversation by exchanging encrypted messages in the same manner. The E2EE session key may be regenerated for each message to ensure message security. The conversation can be ended by the sender or recipient, and the E2EE session key may be deleted from the clients and server.

The process 200 may provide a secure method for group messaging in which user phone numbers are obfuscated. The use of LID-based identifiers in the client server protocol and LID based E2EE sessions and keys ensure that the user's phone number is not exposed to other users in the group. The server may maintain a mapping between LIDs and phone numbers, but only share the mapping for users who have explicitly allowed their phone numbers to be shared. These phone numbers are selectively attached by the server in the messages sent to the recipients. The receiving clients can then show the phone numbers in the UI. For other clients for whom the phone number is not shared, any other display names such as sender's profile name or phone number with some digits masked can be attached by the server in the messages sent to the recipients. The receiving client in this case never learn the phone number of the sender and can show the sender's profile name or masked numbers in the UI. The process 200 may allow for first-class support for 1:1 LID threads, which can be used for secure conversations with businesses or in situations where the user does not want to share their phone number. The process 200 may support a graduation path to a regular phone number-based thread.

The disclosed system(s) address a problem in traditional secure communications techniques tied to computer technology, namely, the technical problem of using phone numbers to identify devices, accounts, or users, but without exposing the phone numbers. The disclosed system solves this technical problem by providing a solution also rooted in computer technology, namely, by providing for phone number obfuscation, such as on social media platforms and instant messaging platforms. The disclosed subject technology further provides improvements to the functioning of the computer itself because it improves processing and efficiency in secure communications.

Figure 3:
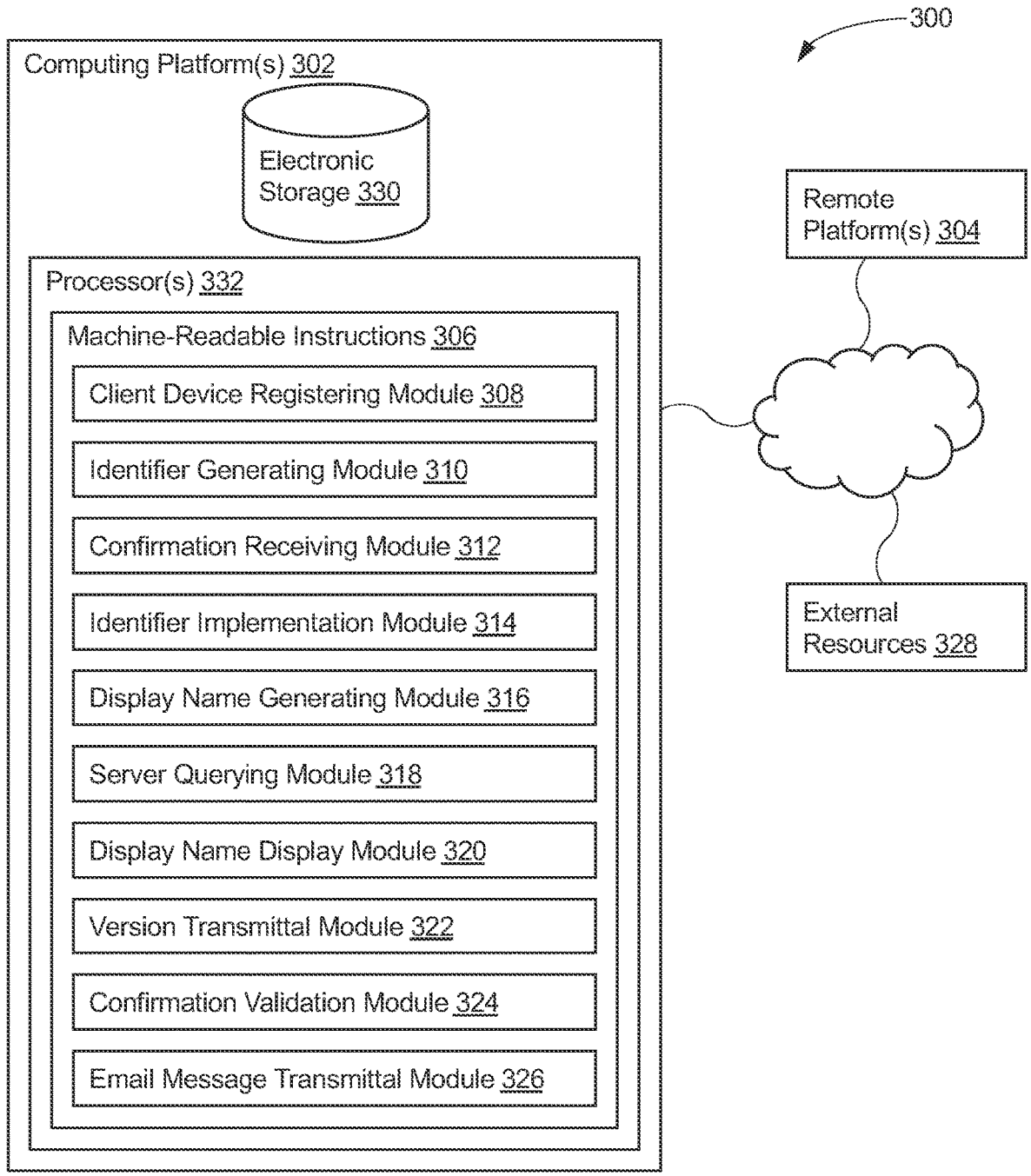
FIG. 3 illustrates a system configured for secure communications, in accordance with one or more implementations.

FIG. 3 illustrates a system 300 configured for secure communications, according to certain aspects of the disclosure. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via the remote platform(s) 304.

Computing platform(s) 302 may be configured by machine-readable instructions 306. Machine-readable instructions 306 may include one or more instruction modules. The instruction modules may include computer program modules. The instruction modules may include one or more of client device registering module 308, identifier generating module 310, confirmation receiving module 312, identifier implementation module 314, display name generating module 316, server querying module 318, display name display module 320, version transmittal module 322, confirmation validation module 324, email message transmittal module 326, and/or other instruction modules.

Client device registering module 308 may be configured to register a client device based on a user identifier. A registration of the client device may be performed through a mobile application. Registering may include transmitting an SMS message including a verification code to the client device, based on the user identifier. The user identifier may include a phone number. The user identifier may be obscured in a user interface during communication. The user identifier may be associated with a social media account.

Identifier generating module 310 may be configured to generate an internal supplemental identifier associated with the user identifier. The internal supplemental identifier may be stored in a database associated with the social media platform. The internal supplemental identifier may be generated based on a random number generator.

Confirmation receiving module 312 may be configured to receive a confirmation of the SMS message from the client device based on the user identifier. The confirmation may include the verification code. Identifier implementation module 314 may be configured to implement the internal supplemental identifier between client-side transactions and server-side transactions.

Display name generating module 316 may be configured to generate a display name associated with the internal supplemental identifier. The display name may be unique to the user identifier. The display name may include a profile name or a randomized selection of numbers. The display name may be randomly generated based on a set of predefined rules. The display name may be distinct for the user identifier.

Server querying module 318 may be configured to query a server-to-user identifier to the internal supplemental identifier. The internal supplemental identifier may be unidentifiable to an entity external to a consumer application server (e.g., a social media server). The internal supplemental identifier may be encrypted for communication between the client device and a server.

Display name display module 320 may be configured to display the display name in a user interface during communication by the client device. Version transmittal module 322 may be configured to transmit an encrypted version of the internal supplemental identifier to the client device for use in subsequent transactions. Confirmation validation module 324 may be configured to validate the confirmation of the SMS message before generating the internal supplemental identifier.

Email message transmittal module 326 may be configured to transmit an email message including a verification code to the client device. The verification code may be valid for a limited time period. The verification code may be generated based on a cryptographic hash function. The verification code may be sent to a telephone number associated with the user identifier. In some implementations, a mapping between the internal supplemental identifier and user identifier may be 1:1.

In some implementations, computing platform(s) 302, remote platform(s) 304, and/or external resources 328 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 328 may be operatively linked via some other communication media.

A given remote platform 304 may include one or more processors configured to execute computer program modules. The computer program modules may be configured to enable an expert or user associated with the given remote platform 304 to interface with system 300 and/or external resources 328, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 328 may include sources of information outside of system 300, external entities participating with system 300, and/or other resources. In some implementations, some or all of the functionality attributed herein to external resources 328 may be provided by resources included in system 300.

Computing platform(s) 302 may include electronic storage 330, one or more processors 332, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 330 may comprise non-transitory storage media that electronically stores information. The electronic storage media of electronic storage 330 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 330 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 330 may include one or more virtual storage resources (e.g., cloud storage, a virtual private network, and/or other virtual storage resources). Electronic storage 330 may store software algorithms, information determined by processor(s) 332, information received from computing platform(s) 302, information received from remote platform(s) 304, and/or other information that enables computing platform(s) 302 to function as described herein.

Processor(s) 332 may be configured to provide information processing capabilities in computing platform(s) 302. As such, processor(s) 332 may include one or more of a digital processor, an analog processor, a digital circuit designed to process information, an analog circuit designed to process information, a state machine, and/or other mechanisms for electronically processing information. Although processor(s) 332 is shown in FIG. 3 as a single entity, this is for illustrative purposes only. In some implementations, processor(s) 332 may include a plurality of processing units. These processing units may be physically located within the same device, or processor(s) 332 may represent processing functionality of a plurality of devices operating in coordination. Processor(s) 332 may be configured to execute modules 308, 310, 312, 314, 316, 318, 320, 322, 324, and/or 326, and/or other modules. Processor(s) 332 may be configured to execute modules 308, 310, 312, 314, 316, 318, 320, 322, 324, and/or 326, and/or other modules by software; hardware; firmware; some combination of software, hardware, and/or firmware; and/or other mechanisms for configuring processing capabilities on processor(s) 332. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, 320, 322, 324, and/or 326 are illustrated in FIG. 3 as being implemented within a single processing unit, in implementations in which processor(s) 332 includes multiple processing units, one or more of modules 308, 310, 312, 314, 316, 318, 320, 322, 324, and/or 326 may be implemented remotely from the other modules. The description of the functionality provided by the different modules 308, 310, 312, 314, 316, 318, 320, 322, 324, and/or 326 described below is for illustrative purposes, and is not intended to be limiting, as any of modules 308, 310, 312, 314, 316, 318, 320, 322, 324, and/or 326 may provide more or less functionality than is described. For example, one or more of modules 308, 310, 312, 314, 316, 318, 320, 322, 324, and/or 326 may be eliminated, and some or all of its functionality may be provided by other ones of modules 308, 310, 312, 314, 316, 318, 320, 322, 324, and/or 326. As another example, processor(s) 332 may be configured to execute one or more additional modules that may perform some or all of the functionality attributed below to one of modules 308, 310, 312, 314, 316, 318, 320, 322, 324, and/or 326.

In particular embodiments, one or more objects (e.g., content or other types of objects) of a computing system may be associated with one or more privacy settings. The one or more objects may be stored on or otherwise associated with any suitable computing system or application, such as, for example, a social-networking system, a client system, a third-party system, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular embodiments, privacy settings may be based on one or more nodes or edges of a social graph. A privacy setting may be specified for one or more edges or edge-types of the social graph, or with respect to one or more nodes, or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system. The object may be associated with a concept node connected to a user node of the first user by an edge. The first user may specify privacy settings that apply to a particular edge connecting to the concept node of the object, or may specify privacy settings that apply to all edges connecting to the concept node. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers may be authorization/privacy servers for enforcing privacy settings. In response to a request from a user (or other entity) for a particular object stored in a data store, the social-networking system may send a request to the data store for the object. The request may identify the user associated with the request and the object may be sent only to the user (or a client system of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system may access such information in order to provide a particular function or service to the first user, without the social-networking system having access to that information for any other purposes. Before accessing, storing, or using such objects or information, the social-networking system may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system.

In particular embodiments, a user may specify whether particular types of objects or information associated with the first user may be accessed, stored, or used by the social-networking system. As an example and not by way of limitation, the first user may specify that images sent by the first user through the social-networking system may not be stored by the social-networking system. As another example and not by way of limitation, a first user may specify that messages sent from the first user to a particular second user may not be stored by the social-networking system. As yet another example and not by way of limitation, a first user may specify that all objects sent via a particular application may be saved by the social-networking system.

In particular embodiments, privacy settings may allow a first user to specify whether particular objects or information associated with the first user may be accessed from particular client systems or third-party systems. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system may provide default privacy settings with respect to each device, system, or application, and/or the first user may be prompted to specify a particular privacy setting for each context. As an example and not by way of limitation, the first user may utilize a location-services feature of the social-networking system to provide recommendations for restaurants or other places in proximity to the user. The first user's default privacy settings may specify that the social-networking system may use location information provided from a client device of the first user to provide the location-based services, but that the social-networking system may not store the location information of the first user or provide it to any third-party system. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, the social-networking system may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system may send a reminder to the user to confirm his or her privacy settings every six months or after every ten photo posts. In particular embodiments, privacy settings may also allow users to control access to the objects or information on a per-request basis. As an example and not by way of limitation, the social-networking system may notify the user whenever a third-party system attempts to access information associated with the user, and require the user to provide verification that access should be allowed before proceeding.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
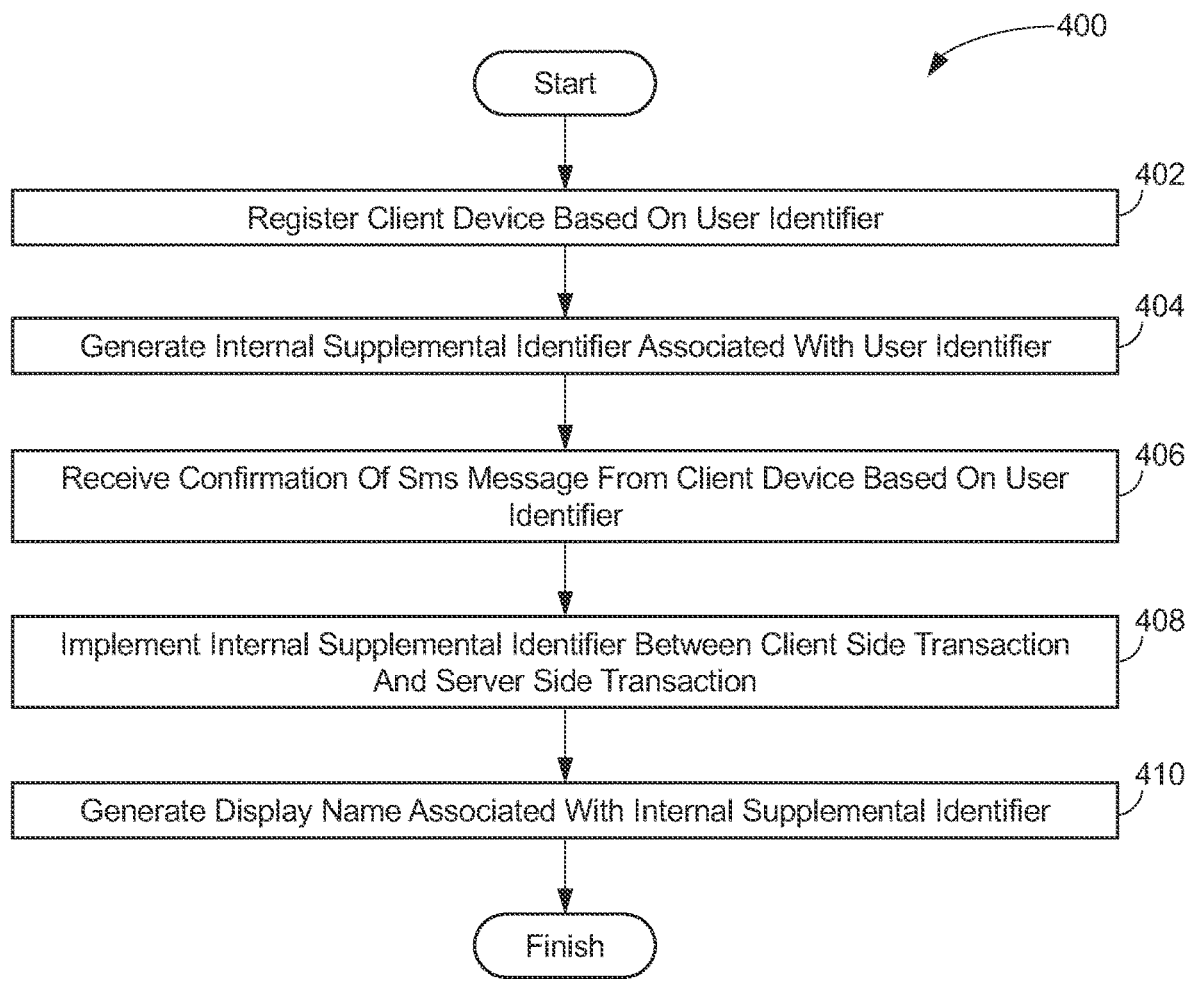
FIG. 4 illustrates an example flow diagram for secure communications, according to certain aspects of the disclosure.

FIG. 4 illustrates an example flow diagram (e.g., process 400) for secure communications, according to certain aspects of the disclosure. For explanatory purposes, the example process 400 is described herein with reference to FIGS. 1-3. Further for explanatory purposes, the steps of the example process 400 are described herein as occurring in serial, or linearly. However, multiple instances of the example process 400 may occur in parallel. For purposes of explanation of the subject technology, the process 400 will be discussed in reference to FIGS. 1-3.

At step 402, the process 400 may include registering a client device based on a user identifier. Registering may include transmitting an SMS message including a verification code to the client device, based on the user identifier. At step 404, the process 400 may include generating an internal supplemental identifier associated with the user identifier. At step 406, the process 400 may include receiving a confirmation of the SMS message from the client device based on the user identifier. The confirmation may include the verification code. At step 408, the process 400 may include implementing the internal supplemental identifier between client-side transactions and server-side transactions. At step 410, the process 400 may include generating a display name associated with the internal supplemental identifier. The display name may be distinct for the user identifier.

For example, as described above in relation to FIG. 3, at step 402, the process 400 may include registering a client device based on a user identifier, through client device registering module 308. Registering may include transmitting an SMS message including a verification code to the client device, based on the user identifier. At step 404, the process 400 may include generating an internal supplemental identifier associated with the user identifier, through identifier generating module 310. At step 406, the process 400 may include receiving a confirmation of the SMS message from the client device based on the user identifier, through confirmation receiving module 312. The confirmation may include the verification code. At step 408, the process 400 may include implementing the internal supplemental identifier between client-side transactions and server-side transactions, through identifier implementation module 314. At step 410, the process 400 may include generating a display name associated with the internal supplemental identifier, through display name generating module 316. The display name may be distinct for the user identifier.

According to an aspect, the user identifier comprises a phone number.

According to an aspect, the internal supplemental identifier is unidentifiable to an entity external to a social media server, and wherein a mapping between the internal supplemental identifier and user identifier is 1:1.

According to an aspect, the process 400 may include querying a server-to-user identifier to internal supplemental identifier.

According to an aspect, the process 400 may include displaying the display name in a user interface during communication by the client device.

According to an aspect, the display name comprises a profile name or a randomized selection of numbers.

According to an aspect, the internal supplemental identifier is encrypted for communication between the client device and a server.

According to an aspect, the process 400 may include transmitting an encrypted version of the internal supplemental identifier to the client device for use in subsequent transactions.

According to an aspect, the verification code is valid for a limited time period.

According to an aspect, the display name is unique to the user identifier.

Figure 5:
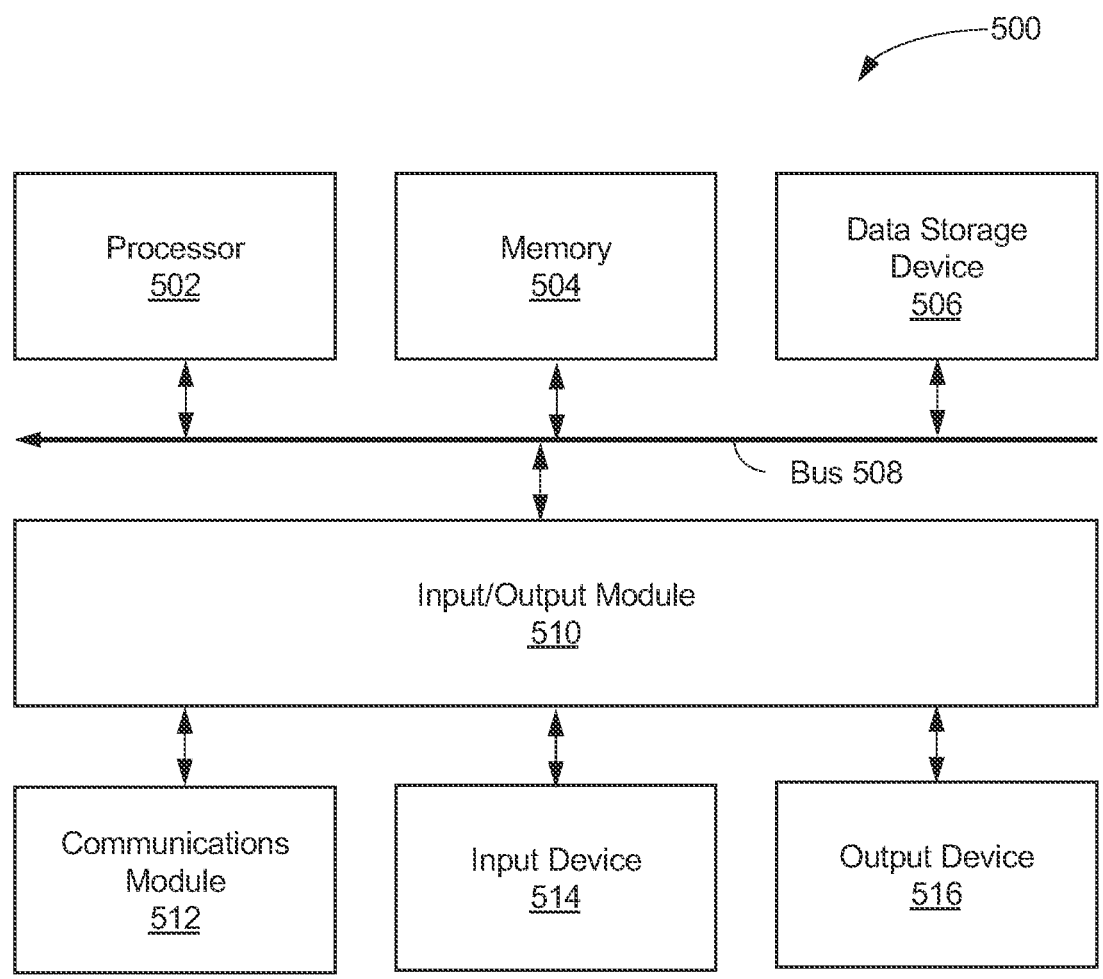
FIG. 5 is a block diagram illustrating an example computer system (e.g., representing both client and server) with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., server and/or client) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer-readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one aspect of the present disclosure, the above-described gaming systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 500 reads game data and provides a game, information may be read from the game data and stored in a memory device, such as the memory 504. Additionally, data from the memory 504 servers accessed via a network the bus 508, or the data storage 506 may be read and loaded into the memory 504. Although data is described as being found in the memory 504, it will be understood that data does not have to be stored in the memory 504 and may be stored in other memory accessible to the processor 502 or distributed among several media, such as the data storage 506.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A method for obscuring a user identifier on a social media platform, the method comprising:
   registering a client device based on the user identifier, wherein registering comprises transmitting an short message service (SMS) message comprising a verification code to the client device;
   generating an internal supplemental identifier associated with the user identifier;
   receiving a confirmation of the SMS message from the client device based on the user identifier, wherein the confirmation comprises the verification code;
   validating, before generating the internal supplemental identifier, the confirmation of the SMS message;
   implementing the internal supplemental identifier between client-side transactions and server-side transactions;
   transmitting, after receiving the confirmation, an encrypted version of the internal supplemental identifier to the client device for use in subsequent transactions; and
   generating a display name associated with the internal supplemental identifier, wherein the display name is distinct from the user identifier.

2. The method of claim 1, wherein the user identifier comprises a phone number.

3. The method of claim 1, wherein the internal supplemental identifier is unidentifiable to an entity external to a social media server, and wherein a mapping between the internal supplemental identifier and the user identifier is 1 to 1.

4. The method of claim 1, further comprising querying a server-to-user identifier to the internal supplemental identifier.

5. The method of claim 1, further comprising displaying the display name in a user interface during communication by the client device.

6. The method of claim 1, wherein the display name comprises a profile name or a randomized selection of numbers.

7. The method of claim 1, wherein the internal supplemental identifier is encrypted for communication between the client device and a server.

8. The method of claim 1, wherein the verification code is valid for a limited time period.

9. The method of claim 1, wherein the display name is unique to the user identifier.

10. A system configured for obscuring a user identifier on a social media platform, the system comprising:
one or more hardware processors configured by machine-readable instructions to:
register a client device based on the user identifier, wherein the user identifier comprises a phone number, and wherein registering comprises transmitting a short message service (SMS) message comprising a verification code to the client device;
generate an internal supplemental identifier associated with the user identifier, wherein the internal supplemental identifier is unidentifiable to an entity external to a social media server, and wherein a mapping between the internal supplemental identifier and the user identifier is 1 to 1;
receive a confirmation of the SMS message from the client device based on the user identifier, wherein the confirmation comprises the verification code;
validate, before generating the internal supplemental identifier, the confirmation of the SMS message;
implement the internal supplemental identifier between client-side transactions and server-side transactions;
transmit, after receiving the confirmation, an encrypted version of the internal supplemental identifier to the client device for use in subsequent transactions; and
generate a display name associated with the internal supplemental identifier, wherein the display name is distinct from the user identifier, and wherein the display name is unique to the user identifier.

11. The system of claim 10, wherein the user identifier is obscured in a user interface during communication.

12. The system of claim 10, wherein the one or more hardware processors are further configured by machine-readable instructions to transmit an email message comprising a verification code to the client device.

13. The system of claim 10, wherein the user identifier is associated with a social media account.

14. The system of claim 10, wherein the internal supplemental identifier is stored in a database associated with the social media platform.

15. The system of claim 10, wherein the verification code is generated based on a cryptographic hash function.

16. The system of claim 10, wherein the display name is randomly generated based on a set of predefined rules.

17. The system of claim 10, wherein the verification code is sent to a telephone number associated with the user identifier.

18. A non-transient computer-readable storage medium having instructions embodied thereon, the instructions being executable by one or more processors to perform a method for obscuring a user identifier on a social media platform, the method comprising:
registering a client device based on the user identifier, wherein the user identifier comprises a phone number, and wherein registering comprises transmitting a short message service (SMS) message comprising a verification code to the client device;
generating an internal supplemental identifier associated with the user identifier, wherein the internal supplemental identifier is unidentifiable to an entity external to a social media server, and wherein a mapping between the internal supplemental identifier and the user identifier is 1 to 1;
receiving a confirmation of the SMS message from the client device based on the user identifier, wherein the confirmation comprises the verification code;
validating, before generating the internal supplemental identifier, the confirmation of the SMS message;
implementing the internal supplemental identifier between client-side transactions and server-side transactions;
generating a display name associated with the internal supplemental identifier, wherein the display name is distinct for the user identifier, and wherein the display name is unique to the user identifier;
transmitting, after receiving the confirmation, an encrypted version of the internal supplemental identifier to the client device for use in subsequent transactions; and
displaying the display name in a user interface during communication by the client device.

* * * * *